United States Patent [19]

Serafini et al.

[11] 4,244,853

[45] Jan. 13, 1981

[54] COMPOSITION AND METHOD FOR MAKING POLYIMIDE RESIN-REINFORCED FABRIC

[75] Inventors: Tito T. Serafini, Middleburg Heights; Peter Delvigs, Fairview Park, both of Ohio

[73] Assignee: The United States of America as represented by the Administrator of the National Aeronautics and Space Administration, Washington, D.C.

[21] Appl. No.: 27,557

[22] Filed: Apr. 6, 1979

[51] Int. Cl.$^3$ ............................ C08K 5/05; C08K 5/13
[52] U.S. Cl. ............................... 260/33.4 R; 427/221; 427/379; 528/353
[58] Field of Search ....... 260/857 L, 857 UN, 33.4 R; 528/181, 353; 427/221, 379, 381

[56] References Cited

U.S. PATENT DOCUMENTS

| | | | |
|---|---|---|---|
| 3,689,464 | 9/1972 | Holub et al. | 260/857 UN |
| 3,745,149 | 7/1973 | Serafini et al. | 260/32.6 NT |

*Primary Examiner*—Joseph L. Schofer
*Assistant Examiner*—Peter F. Kulkosky
*Attorney, Agent, or Firm*—N. T. Musial; John R. Manning; J. A. Mackin

[57] ABSTRACT

A composition for making polyimide resin-reinforced fibers or fabric. The composition is of the type disclosed in U.S. Pat. No. 3,745,149 and includes a polyfunctional ester, a polyfunctional amine, and an end-capping agent. The composition is impregnated into fibers or fabric and heated to form prepreg material. The tack retention characteristics of this prepreg material are improved by incorporating into the composition a liquid olefinic material compatible with the other ingredients of the composition. The prepreg material is heated at a higher temperature to effect formation of the polyimide resin and the monomeric additive is incorporated in the polyimide polymer structure.

4 Claims, No Drawings

COMPOSITION AND METHOD FOR MAKING POLYIMIDE RESIN-REINFORCED FABRIC

BACKGROUND OF THE INVENTION

The present invention relates to compositions for making polyimide resin-reinforced fabrics and to methods of making such fabrics. More particularly, the invention relates to an improvement of such compositions and methos disclosed in U.S. Pat. No. 3,745,149, issued July 10, 1973, and herein incorporated by reference.

The polyimide resins to which the invention relates are noted for their high thermal and oxidative stability, high strength at elevated temperatures, and which exhibit many other outstanding physical and chemical properties useful in high temperature applications.

U.S. Pat. No. 3,528,950 discloses a method for preparing addition-type polyimides, in which an end-capped, low molecular weight prepolymer is prepared in a refluxing solvent. The prepolymer is isolated and then heated to a temperature of 200° to 350° C. to form polyimide macromolecules. The prepolymer has a very limited solubility in organic solvents, and thus does not allow facile impregnation of fibers for fabrication of fiber-reinforced polyimide composite articles.

An improved method for preparing high molecular weight addition-type polyimides is described in U.S. Pat. No. 3,745,149. In this method, the polyimides are synthesized from a mixture of a polyfunctional amine, a polyfunctional ester, and an end-capping agent.

The polyfunctional ester (a) has the formula:

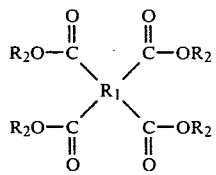

wherein $R_1$ is a tetravalent aryl radical and $R_2$ is alkyl or hydrogen, at least two $R_2$ groups being alkyl.

The polyfunctional amine (b) has the formula:

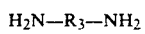

wherein $R_3$ is a divalent aryl radical.

The end-capping agent (c) has the formula:

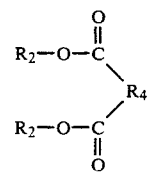

wherein $R_2$ is alkyl or hydrogen, at least one $R_2$ group being alkyl and $R_4$ is a divalent radical of the formula:

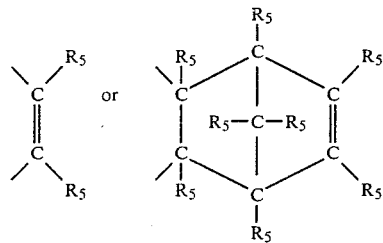

wherein $R_5$ is hydrogen or lower alkyl of one to four carbon atoms, preferably methyl.

The molar ratio of a:b:c being n:n+1:2 wherein n has a value of 1-20, the compounds being present in an amount of 30 to 70% by weight of the solution.

A solution of the foregoing components is used for the preparation of reinforced fibers or fabric. The solution is impregnated into the fibers and then heated at a temperature of up to about 210° C. to remove solvent and to form a prepolymer in the fibers or fabric and the thus prepared "prepreg" material is subsequently heated at a temperature of about 275° to 350° C. to form the polyimide resin in the fibers or fabric. Usually, solvent removal is effected at a temperature of about 50° to 120° C. and prepolymerization is subsequently effected at a temperature of about 125° to 210° C. The prepolymer has a molecular weight of about 400 to 10,000 and the polyimide resin has a molecular weight of over 10,000. Further details concerning the composition and its use will be found in the patent disclosure.

One of the advantages of the composition and method described in U.S. Pat. No. 3,745,149 is that there is no need for prior synthesis of the polyimide procuesors. However, one limitation of the method is that impregnated fiber materials, more commonly known as prepreg, prepared in accordance with the monomer solutions described in the method exhibit limited tack "as prepared" and limited retention of tack when exposed to ambient conditions. Tack, and particularly tack retention, is a desirable property of the prepreg material and it is a disadvantage of the compositions of U.S. Pat. No. 3,745,149 that tack retention is poor.

It is an object of the present invention to provide a novel composition and method for forming polyimide resin-reinforced fibers or fabric. It is a further object to provide such compositions wherein, at a "prepreg" state, the prepreg material exhibits good tack and tack retention properties.

BRIEF SUMMARY OF THE INVENTION

The foregoing and other objects which will be apparent to those of ordinary skill in the art are achieved, in accordance with the present invention, by providing a composition for making a polyimide resin-reinforced fiber or fabric and comprising a solution, in an organic solvent, of a polyfunctional ester, a polyfunctional amine, and an end-capping agent as described above and which is improved by dissolving therein a copolymerizable, liquid, olefinic monomer compatible with the other ingredients of the solution, soluble in the solvent, and having a boiling point of about 50° to 150° C. The olefinic monomer is used in an amount of about 1 to 20% by weight based on the total weight of the polyfunctional ester, the polyfunctional amine, the end-capping agent and the olefinic monomer. In accordance with the present invention, the composition is impregnated into fibers or fabric and the impregnated material is heated at an elevated temperature to form a prepreg material comprising polyimide prepolymer having a molecular weight of about 400 to 10,000 and having improved tack retention properties. The prepreg material is subsequently heated at a higher temperature of about 275° to 350° C. to effect formation of the polyimide resin having a molecular weight of above 10,000 to form the polyimide resin-reinforced product.

The solvent is conveniently removed by relatively gentle heating at a suitable temperature such as about 50° to 120° C. Formation of the prepolymer is preferably effected at a temperature of about 125° to 210° C. The inclusion of the liquid olefinic material results in a prepreg material of enhanced tack retention characteristics. The chemical nature of the olefinic additive can vary widely provided that the other characteristics, mentioned above, are maintained. Suitable examples include vinyl benzene, N-vinyl-2-pyrollidone; 5-vinyl-2-norbornene; and 2,5-norbornadiene. The monomer serves as a reactive dilutent which provides improved tack retention characteristics to the prepreg and which is ultimately incorporated into the polymer molecular structure during curing of the prepreg material.

An important advantage of the present invention is that prepreg materials exhibit good retention of tack.

In each of the examples which follow, the prepreg materials exhibit excellent retention of tack during unprotected exposure to ambient conditions, for about four days (96 hours) compared to prepreg materials prepared without the addition of an olefinic containing monomer which exhibits very limited tack after four hours of unprotected exposure at ambient conditions. Furthermore, the significantly improved tack retention characteristics are achieved without any adverse effects on the processability and elevated temprature mechanical properties of the composites.

EXAMPLE 1

A mixture of 5.802 grams of 5-norbornene-2, 3-dicarboxylic acid monomethyl ester, 9.046 grams of 4,4'-methylene dianiline, 11.923 grams of 3,3',4,4'-benzophenonetetracarboxylic acid dimethylester, and 1.409 grams of styrene is dissolved in 28.2 grams of absolute ethanol by stirring at room temperature. The resulting solution contains 50 percent monomers by weight. The styrene content is 5 percent of the total monomer weight.

Approximately 34 grams of graphite fiber are impregnated with the above solution by first winding the fiber onto a mandrel, then applying the solution evenly to the fiber with a brush. The impregnated fiber is then dried at approximately 120° F. for one hour to reduce the solvent content to 5 to 10 percent by weight.

Twelve plies of 3 by 7⅛ inches are cut and stacked unidirectionally in a preforming mold and staged for 3 hours at 250° F. under an applied pressure of 0.1 psi. The staged prepreg is then inserted into a matched metal die preheated to 450° F. The mold is closed and contact pressure maintained for 10 minutes, then 500 psi pressure is applied and the temperature is increased to 600° F. at a rate of 9° F. per minute. After one hour at 600° F. and 500 psi, the pressure is released and the mold slowly cooled to room temperature. The resulting polyimide-graphite fiber composite is essentially void-free and exhibits excellent mechanical properties. As mentioned, the prepreg material exhibits excellent tack retention.

EXAMPLES 2-8

Example 1 is followed except that the following materials are used in lieu of the styrene employed in Example 1:

| Example No. | Olefinic Agent |
| --- | --- |
| 2 | N-vinyl pyrollidone |
| 3 | 5-vinyl-2-norbornene |

Results are similar to those of Example 1.

EXAMPLE 4

A mixture of 5.802 g of 5-norbornene-2, 3-dicarboxylic acid monomethyl ester, 9.046 g of 4,4'-methylenedianiline, 11.923 g of 3,3', 4,4'-benzophenonetetracarboxylic acid dimethyl ester, and 6.692 g of styrene is dissolved in 33.5 g of anhydrous methanol by stirring at room temperature. The resulting solution contains 50% monomers by weight. The styrene content is 20% of the total monomer weight. Using the procedure of Example 1, the solution is used to impregnate graphite fiber and to fabricate a polyimide-graphite fiber composite.

EXAMPLE 5

The monomer solution is prepared as described in Example 1, except that 1.409 g of 2,5-norbornadiene are used instead of styrene. The fiber impregnation and composite fabrication are carried out using the procedure of Example 1.

EXAMPLE 6

The monomer solution is prepared as described in Example 2, except that 6.692 g of 2,5-norbornadiene are used instead of styrene. The fiber impregnation and composite fabrication are carried out using the procedure of Example 1.

EXAMPLE 7

A mixture of 6.899 of 5-norbornene-2,3-dicarboxylic acid monomethyl ester, 5.075 g of p-phenylenediamine, 14.931 g of 4,4'-(hexafluoroisopropylidene)-bis(phthalic acid)dimethyl ester, and 1.416 of styrene is dissolved in 28.3 g of absolute ethanol by stirring at room temperature. The solution contains 50% monomers by weight. The styrene content is 5% of the total monomer weight. The fiber impregnation and composite fabrication are carried out using the procedure of Example 1.

EXAMPLE 8

The monomer solution is prepared as described in Example 7, except that 1.416 g of 2,5-norbornadiene are used instead of styrene. The fiber impregnation and composite fabrication are carried out using the procedure of Example 1.

The above-described invention discloses a composition and a method for making a fiber reinforced-polyimide resin. More particularly, the method discloses the preparation of PMR polyimide prepreg (impregnated fiber) materials with improved tack retention characteristics. It will be understood that changes and modifications may be made to the above-described invention without departing from the spirit and scope of the invention as set forth in the claims appended hereto.

What is claimed is:

1. In a composition of matter comprising a solution, in an organic solvent, of the following compounds:

(a) a polyfunctional ester having the formula:

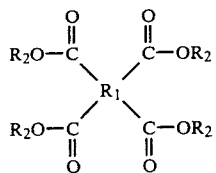

wherein $R_1$ is a tetravalent acryl radical and $R_2$ is alkyl or hydrogen, at least two $R_2$ groups being alkyl;

(b) a polyfunctional amine having the formula:

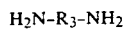

$H_2N-R_3-NH_2$ wherein $R_3$ is a divalent aryl radical; and (c) an end-capping agent having the formula:

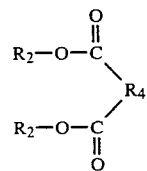

wherein $R_2$ is alkyl or hydrogen, at least one $R_2$ group being alkyl and $R_4$ is a divalent radical of the formula:

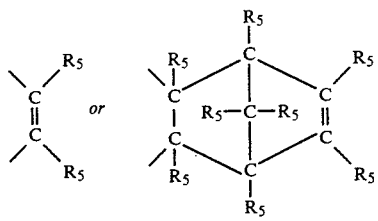

wherein $R_5$ is hydrogen or lower alkyl; the molar ratio of a:b:c being n:n+1:2 wherein n has a value of 1-20, said compounds being present in an amount of 30 to 70% by weight of the solution, the improvement wherein said solution further comprises a copolymerizable, liquid, olefinic monomer compatible with the ingredients, said olefinic monomer having a boiling point of about 50° to 150° C., and being soluble in said solvent, the amount of said olefinic monomer dissolved in said solution being from 1 to 20% by weight based on the total weight of said polyfunctional ester, said polyfunctional amine, said end-capping agent, and said olefinic monomer.

2. An improved composition according to claim 1 wherein said olefinic monomer is selected from the group consisting of N-vinyl-2-pyrollidone; 5-vinyl-2-norbornene; 2,5-norbornadiene; and vinylbenzene.

3. In a method of forming a polyimide resin-reinforced fiber which comprises impregnating a fiber with a solution, in organic solvent, containing the following compounds:

(a) a polyfunctional ester having the formula:

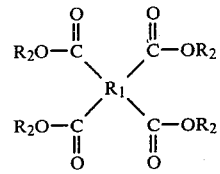

wherein $R_1$ is a tetravalent aryl radical and $R_2$ is alkyl or hydrogen, at least two $R_2$ groups being alkyl;

(b) a polyfunctional amine having the formula:

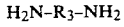

$H_2N-R_3-NH_2$ wherein $R_3$ is a divalent aryl radical; and (c) an end-capping agent having the formula:

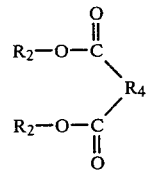

wherein $R_2$ is alkyl or hydrogen, at least one $R_2$ group being alkyl and $R_4$ is a divalent radical of the formula:

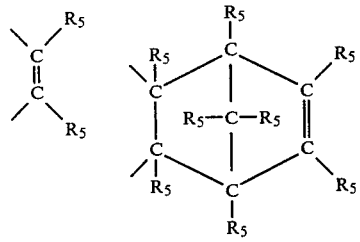

wherein $R_5$ is hydrogen or lower alkyl; the molar ratio of a:b:c being n:n1:2 wherein n has a value of 1-20, said compounds being present in an amount of 30 to 70% by weight of the solution, in which the impregnated fabric is heated at an elevated temperature to form a prepreg material comprising polyimide prepolymer in said fabric and in which the prepreg material is heated at a higher elevated temperature to form a polyimide resin reinforcing said fabric;

the improvement wherein the tack retention properties of said prepreg material are enhanced by including, in said solution, a copolymerizable, liquid, olefinic monomer compatible with the ingredients, said olefinic monomer having a boiling point of about 50° to 150° C., and being soluble in said solvent, the amount of said olefinic monomer dissolved in said solution being from 1 to 20% by weight based on the total weight of said polyfunctional ester, said polyfunctional amine, said end-capping agent, and said olefinic monomer, removing said solvent by heating said impregnated fibers at a temperature in the range of about 50° to 120° C., forming a prepolymer by heating said impregnated fiber at a temperature in the range of about 125° to 210° C., and heating the prepreg material at a temperature in the range of about 275° to 350° C. to form said polyimide resin.

4. An improved method according to claim 3 wherein said olefinic monomer is selected from the group consisting of N-vinyl-2-pyrollidone; 5-vinyl-2-norbornene; 2,5-norbornadiene; and vinylbenzene.

* * * * *